(12) United States Patent
Wang

(10) Patent No.: US 9,449,163 B2
(45) Date of Patent: Sep. 20, 2016

(54) ELECTRONIC DEVICE AND METHOD FOR LOGGING IN APPLICATION PROGRAM OF THE ELECTRONIC DEVICE

(71) Applicant: Chiun Mai Communication Systems, Inc., New Taipei (TW)

(72) Inventor: Hsin-Wei Wang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/528,749

(22) Filed: Oct. 30, 2014

(65) Prior Publication Data

US 2015/0169859 A1   Jun. 18, 2015

(30) Foreign Application Priority Data

Dec. 17, 2013   (CN) .......................... 2013 1 0691227

(51) Int. Cl.
*H04L 29/06*   (2006.01)
*G06F 21/32*   (2013.01)

(52) U.S. Cl.
CPC .................................... *G06F 21/32* (2013.01)

(58) Field of Classification Search
CPC ....................................................... G06F 21/32
USPC ............................................................ 726/19
See application file for complete search history.

(56) References Cited

U.S. PATENT DOCUMENTS

| | | | | |
|---|---|---|---|---|
| 8,625,796 | B1* | 1/2014 | Ayed | H04L 63/0492 380/258 |
| 2002/0054695 | A1* | 5/2002 | Bjorn | G06F 3/03547 382/124 |
| 2004/0187009 | A1* | 9/2004 | Ebata | G06F 21/32 713/185 |
| 2007/0240204 | A1* | 10/2007 | Somekawa | H04L 63/08 726/5 |
| 2008/0288291 | A1* | 11/2008 | Bartelt | G06F 19/3406 705/3 |
| 2009/0055910 | A1* | 2/2009 | Lee | G06F 21/46 726/6 |
| 2010/0133338 | A1* | 6/2010 | Brown | G06F 21/32 235/382 |
| 2010/0138666 | A1* | 6/2010 | Adams | G06F 21/32 713/186 |
| 2011/0310044 | A1* | 12/2011 | Higuchi | G06F 1/1684 345/173 |
| 2014/0223525 | A1* | 8/2014 | Fadida | H04L 63/083 726/6 |
| 2014/0380061 | A1* | 12/2014 | Wong | G06F 21/32 713/189 |
| 2015/0237049 | A1* | 8/2015 | Grajek | H04L 63/0815 726/7 |

* cited by examiner

*Primary Examiner* — Michael S McNally
(74) *Attorney, Agent, or Firm* — Zhigang Ma

(57) ABSTRACT

A method for logging in to an application program of an electronic device presets a plurality groups of account information of the application program, and presets fingerprints corresponding the plurality of groups of account information in a storage device. When the application program is executed and a user interface of the application program is displayed, the method receives fingerprint data input. When the received fingerprint data matches one of the fingerprints, the method further confirms a group of account information corresponding to the matched fingerprint, and logs in to the application program using the confirmed account information.

12 Claims, 3 Drawing Sheets

ELECTRONIC DEVICE AND METHOD FOR LOGGING IN APPLICATION PROGRAM OF THE ELECTRONIC DEVICE

CROSS-REFERENCE TO RELATED APPLICATION

This application claims priority to Chinese Patent Application No. 201310691227.0 filed on Dec. 17, 2013, the contents of which are incorporated by reference herein.

FIELD

Embodiments of the present disclosure relate to device controlling technology, and particularly to an electronic device and method for logging in to an application program of the electronic device.

BACKGROUND

An electronic device (for example, a mobile phone) can install a large number of application programs, such as navigation software and shopping software. Generally, a user of the electronic device needs to input registration account information manually (for example, an account name and a corresponding password) to log in each of the application programs, although some application programs can store the account information for the user to log in to the application programs automatically. However, if the user does not use the stored account information to log in to the application programs within a preset time duration, the user often needs to input the account information again. If the user does not remember the account information clearly, the user cannot log in.

BRIEF DESCRIPTION OF THE DRAWINGS

Implementations of the present disclosure will be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references can mean "at least one," or "one or more."

In the present disclosure, "module," refers to logic embodied in hardware or firmware, or to a collection of software instructions, written in a program language. In at least one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

Figure 1:
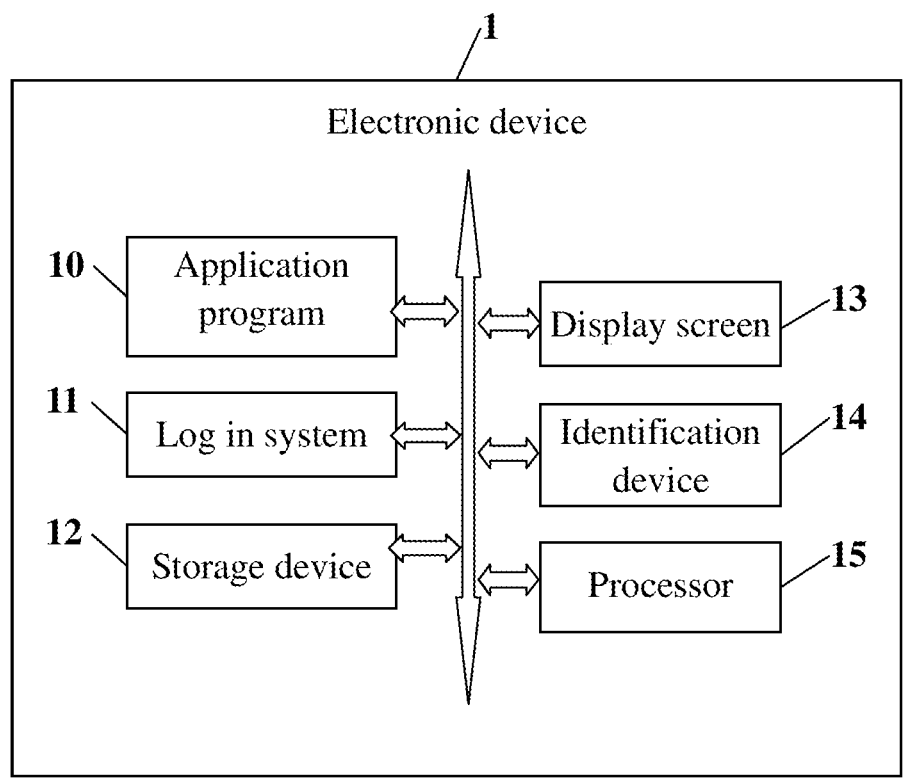
FIG. 1 is a block diagram of one embodiment of an electronic device including a log in system.

FIG. 1 is a block diagram of one embodiment of an electronic device including a log in system. In at least one embodiment, an electronic device 1 can be a mobile phone, a tablet computer, a notebook computer, or any other electronic device. The electronic device 1 includes, but is not limited to, at least one application program 10, a log in system 11, a storage device 12, a display screen 13, an identification device 14, and at least one processor 15. The application program 10 can be stored in the storage device 12 and can be executed by the processor 15 of the electronic device 1.

The application program 10 has a user interface for a user to log in to the application program 10. The user of the electronic device 1 can input account information (e.g., an account name and a password) at a preset column on the user interface of the application program 10, and logs in to the application program 10. In at least one embodiment, the storage device 12 can store a plurality of groups of account information of different users for the application program 10 which can be used to log in to the application program 10. Each group of the account information can include an account name and a corresponding password.

In at least one embodiment, the storage device 12 can be an internal storage system, such as a random access memory (RAM) for temporary storage of information, and/or a read only memory (ROM) for permanent storage of information. The storage device 12 can also be an external storage card, such as a smart media card or a secure digital card. The identification device 14 can collect and identify fingerprint data. When the display screen 13 is a touch screen, the identification device 14 can be integrated with the display screen 13 to identify the fingerprint data. The at least one processor 15 executes one or more computerized codes and other programs of the electronic device 1 to provide functions of the log in system 11.

In at least one embodiment, the log in system 11 can log in to the application program 10 of the electronic device 1 automatically by recognizing fingerprint data input from the identification device 14.

Figure 2:
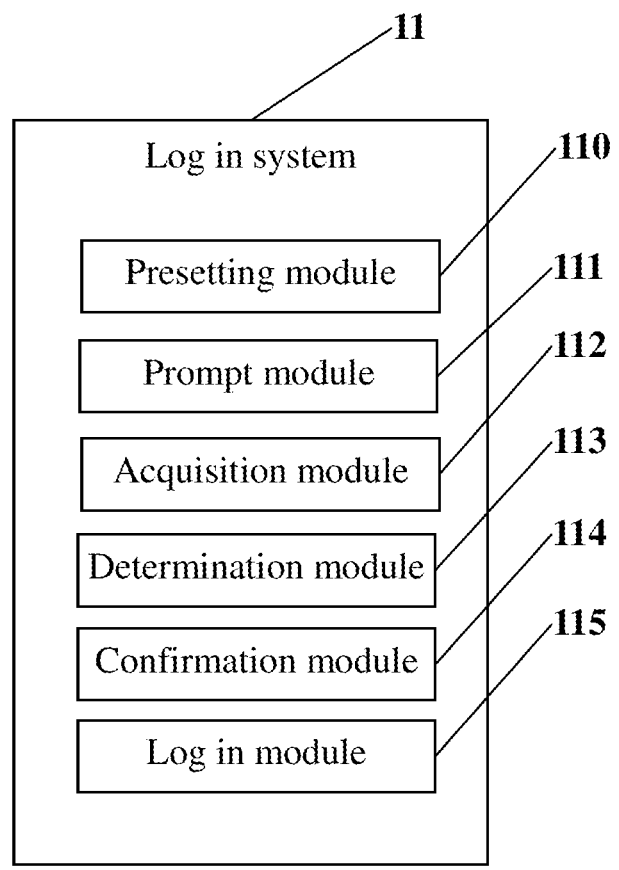
FIG. 2 is a block diagram of one embodiment of a log in system in the electronic device 1 of FIG. 1.

FIG. 2 is a block diagram of one embodiment of a log in system in the electronic device of FIG. 1. In this embodiment, the log in system 11 can include a presetting module 110, a prompt module 111, an acquisition module 112, a determination module 113, a confirmation module 114, and a log in module 115. The modules 110-115 include computerized code in the form of one or more programs that are stored in the storage device 12. The computerized code includes instructions that are executed by the at least one processor 15 to provide functions of the log in system 11.

The presetting module 110 presets a plurality of groups of account information of the application program 10, and presets a fingerprint corresponding to each group of account information of the application program 10 in the storage device 12. The user of the electronic device 1 can preset the fingerprint for the application program 10 using the identification device 14. The fingerprint can include fingerprint data of one or more fingers of the user of the electronic device 1.

In other embodiments, the presetting module 110 can further preset other fingerprints of different users corresponding to the other groups of account information prestored in the storage device 12.

When the application program 10 is selected to be executed and the user interface of the application program 10 is displayed on the display screen 13, the prompt module 111 prompts the user of the electronic device 10 to input fingerprint data, and determines whether the fingerprint data needs to be input according to a user operation. In at least one embodiment, the prompt module 111 can display a preset icon on the display screen 13 after the user interface of the application program 10 is displayed. If the preset icon is selected by the user, the prompt module 111 determines that the fingerprint data needs to be input, and the user can input the fingerprint data using the identification device 14. If the preset icon is not selected, the user can input the account information using an input unit (not shown in FIG. 1) of the electronic device 1 manually.

In other embodiments, the prompt module 111 can offer a first choice of inputting the fingerprint data and a second choice of inputting account information for the user to select. If the first choice is selected, the prompt module 111 determines that the fingerprint data needs to be input. When the fingerprint data is determined to be input, the acquisition module 112 receives the fingerprint data from the identification device 14. If the second choice is selected, the prompt module 111 determines that there is no need to input the fingerprint data.

In at least one embodiment, after the user inputs the account information manually to log in to the application program 10, the prompt module 111 further prompts the user to preset fingerprint corresponding to the input account information. If the user selects to preset a fingerprint corresponding to the input account information, the presetting module 110 can receive fingerprint data and preset the received fingerprint data as a fingerprint corresponding to the input account information for the application program 10.

The determination module 113 determines whether the received fingerprint data matches one of the fingerprints of the application program 10 stored in the storage device 12. In at least one embodiment, the determination module 113 can compare the received fingerprint data with the fingerprint data of the fingerprints corresponding to all groups of account information of the application program 10 in the storage device 12, and determines whether the received fingerprint data matches the fingerprint data of one of the fingerprints.

If the received fingerprint data is identical to the fingerprint data of one of the fingerprints, the received fingerprint data is determined to match one of the fingerprint of the application program 10. If the received fingerprint data is different from the fingerprint data of all the fingerprints, that is, no fingerprint of the application program 10 stored in the storage device 12 is matched with the received fingerprint data, the prompt module 111 can prompt the user of the electronic device 1 to input the fingerprint data again.

The confirmation module 114 confirms a group of account information corresponding to the matched fingerprint of the application program 10 from the storage device 12.

The log in module 115 logs in to the application program 10 using the confirmed account information corresponding to the matched fingerprint.

Figure 3:
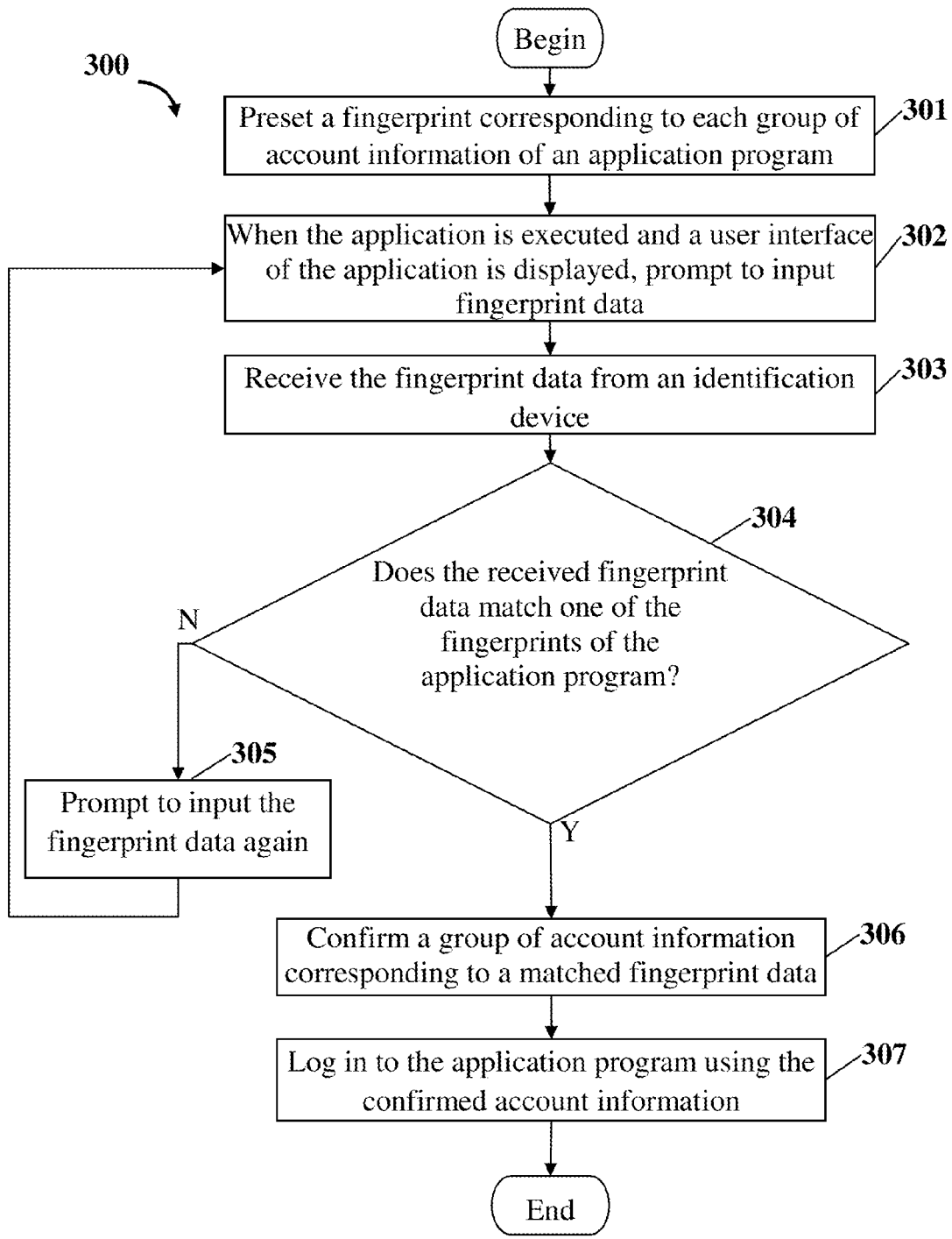
FIG. 3 is a flowchart of one embodiment of a method for logging in to an application program of the electronic device of FIG. 1.

FIG. 3 is a flowchart of one embodiment of a method for logging in to an application program of the electronic device of FIG. 1. In the embodiment, the method is performed by execution of computer-readable software program codes or instructions by at least one processor 15 of the electronic device 1. Referring to FIG. 3, a flowchart is presented in accordance with an example embodiment which is being thus illustrated. In the embodiment, the example method 300 is provided by way of example only as there are a variety of ways to carry out the method. The method 300 described below can be carried out using the configurations illustrated in FIG. 1-FIG. 2, for example, and various elements of these figures are referenced in explaining the example method 300. Each block shown in FIG. 3 represents one or more processes, methods or subroutines, carried out in the exemplary method 300. Additionally, the illustrated order of blocks is by example only and the order of the blocks can be changed according to the present disclosure. The exemplary method 300 can begin at block 301.

At block 301, the presetting module presets a plurality of groups of account information of the application program 10, and presets a fingerprint corresponding each group of account information of the application program 10 in the storage device 12. Each group of the account information can include an account name and a corresponding password. The user of the electronic device 1 can preset the fingerprint for the application program 10 using the identification device 14. The fingerprint corresponding each group of account information can include fingerprint data of one or more fingers of the user of the electronic device 1.

At block 302, when the application program 10 is selected to be executed and the user interface of the application program 10 is displayed on the display screen 13, the prompt module prompts the user of the electronic device 10 to input fingerprint data, and determines whether the fingerprint data needs to be input according to a user operation. In at least one embodiment, the prompt module can display a preset icon on the display screen 13 after the user interface of the application program 10 is displayed. If the preset icon is selected by the user, the prompt module determines that the fingerprint data needs to be input, and the user can input the fingerprint data using the identification device 14. If the preset icon is not selected, the prompt module determines that there is no need to input the fingerprint data, and the user can input the account information using an input unit (not shown in FIG. 1) of the electronic device 1 manually.

At block 303, when the fingerprint data is determine to be input, the acquisition module receives the fingerprint data from the identification device 14.

At block 304, the determination module determines whether the received fingerprint data matches one of the fingerprints of the application program 10 stored in the storage device 12. In at least one embodiment, if the received fingerprint data is identical to the fingerprint data of one of the fingerprints corresponding to all groups of account information of the application program 10 in the storage device 12, the received fingerprint data is determined to match one of the fingerprint of the application program 10, and block 306 is implemented. If the received fingerprint data is different from the fingerprint data of all the fingerprints, that is, no fingerprint of the application program 10 stored in the storage device 12 is matched with the received fingerprint data, and block 305 is implemented.

At block 305, the prompt module prompts the user of the electronic device 1 to input the fingerprint data again, and block 303 is repeated.

At block 306, the confirmation module confirms a group of account information corresponding to the matched fingerprint of the application program 10 from the storage device 12.

At block 307, the log in module logs in to the application program 10 using the confirmed account information corresponding to the matched fingerprint, and the procedure ends.

All of the processes described above may be embodied in, and fully automated via, functional code modules executed by one or more general purpose processors such as the processor 15. The code modules may be stored in any type of non-transitory readable medium or other storage device such as the storage device 12. Some or all of the methods may alternatively be embodied in specialized hardware. Depending on the embodiment, the non-transitory readable medium can be a hard disk drive, a compact disc, a digital versatile disc, a tape drive, or other storage medium.

The described embodiments are merely examples of implementations, and have been set forth for a clear understanding of the principles of the present disclosure. Variations and modifications may be made without departing substantially from the scope of the present disclosure. All such modifications and variations are intended to be included within the scope of this disclosure and the described inventive embodiments, and the present disclosure is protected by the following claims and their equivalents.

What is claimed is:

1. A computer-implemented method for logging in to an application program of an electronic device, the method comprising:
    presetting a plurality of groups of account information for the application program, and presetting fingerprints corresponding to the plurality of groups of account information in a storage device of the electronic device;
    offering a first choice of inputting fingerprint data and a second choice of manually inputting account information when the application program is executed;
    if the first choice is selected, receiving a first fingerprint data from an identification device of the electronic device;
    when the first fingerprint data matches one of the preset fingerprints, confirming a group of account information corresponding to the matched fingerprint;
    logging in to the application program using the confirmed account information;
    if the second choice is selected, receiving the account information that is manually input and logging into the application program using the manually input account information; and
    receiving a second fingerprint data and presetting the second fingerprint data as a fingerprint corresponding to the manually input account information for the application program.

2. The method according to claim 1, further comprising:
    comparing the first fingerprint data with fingerprint data of the fingerprints corresponding to the plurality of groups of account information of the application program in the storage device, and determining whether the first fingerprint data matches the fingerprint data of one of the fingerprints;
    determining that the first fingerprint data matches one of the fingerprints when the first fingerprint data is identical to the fingerprint data of one of the fingerprints; or
    determining that the first fingerprint data does not match the fingerprints and prompting a user of the electronic device to input the first fingerprint data again when the first fingerprint data is different from the fingerprint data of the fingerprints.

3. The method according to claim 1, wherein each of the fingerprints corresponding to the plurality of groups of account information comprises fingerprint data of one or more fingers of a user of the electronic device.

4. The method according to claim 1, wherein each of the plurality of groups of account information comprises an account name and a password.

5. A non-transitory storage medium storing a set of instructions, when executed by at least one processor of an electronic device, cause the at least one processor to perform a method for logging in to an application program of the electronic device, the method comprising:
    presetting a plurality of groups of account information for the application program, and presetting fingerprints corresponding to the plurality of groups of account information in a storage device of the electronic device;
    offering a first choice of inputting fingerprint data and a second choice of manually inputting account information when the application program is executed;
    if the first choice is selected, receiving a first fingerprint data from an identification device of the electronic device;
    when the first fingerprint data matches one of the preset fingerprints, confirming a group of account information corresponding to the matched fingerprint;
    logging in to the application program using the confirmed account information;
    if the second choice is selected, receiving the account information that is manually input and logging into the application program using the manually input account information; and
    receiving a second fingerprint data and presetting the second fingerprint data as a fingerprint corresponding to the manually input account information for the application program.

6. The storage medium according to claim 5, wherein the method further comprising:
    comparing the first fingerprint data with fingerprint data of the fingerprints corresponding to the plurality of groups of account information of the application program in the storage device, and determining whether the first fingerprint data matches the fingerprint data of one of the fingerprints;
    determining that the first fingerprint data matches one of the fingerprints when the first fingerprint data is identical to the fingerprint data of one of the fingerprints;
    determining that the first fingerprint data does not match the fingerprints, and prompting a user of the electronic device to input the first fingerprint data again when the first fingerprint data is different from the fingerprint data of the fingerprints.

7. The storage medium according to claim 5, wherein each of the fingerprints corresponding to the plurality of groups of account information comprises fingerprint data of one or more fingers of a user of the electronic device.

8. The storage medium according to claim 5, wherein each of the plurality of groups of account information comprises an account name and a password.

9. An electronic device, comprising:
    an application program;
    at least one processor; and
    a storage device storing one or more programs, which when executed by the at least one processor, cause the at least one processor to:
    preset a plurality of groups of account information for the application program, and preset fingerprints corresponding to the plurality of groups of account information in the storage device;

offering a first choice of inputting fingerprint data and a second choice of manually inputting account information when the application program is executed;

if the first choice is selected, receive a first fingerprint data from an identification device of the electronic device;

when the first fingerprint data matches one of the preset fingerprints, confirm a group of account information corresponding to the matched fingerprint;

log in to the application program using the confirmed account information;

if the second choice is selected, receiving the account information that is manually input and logging into the application program using the manually input account information; and receiving a second fingerprint data and presetting the second fingerprint data as a fingerprint corresponding to the manually input account information for the application program.

10. The electronic device according to claim 9, wherein the at least one processor further compares the first fingerprint data with fingerprint data of the fingerprints corresponding to the plurality of groups of account information of the application program in the storage device, and determining whether the first fingerprint data matches the fingerprint data of one of the fingerprints;

determines that the first fingerprint data matches one of the fingerprints when the first fingerprint data is identical to the fingerprint data of one of the fingerprints;

determines that the first fingerprint data does not match the fingerprints and prompts a user of the electronic device to input the first fingerprint data again when the first fingerprint data is different from the fingerprint data of the fingerprints.

11. The electronic device according to claim 9, wherein each of the fingerprints corresponding to the plurality of groups of account information comprises fingerprint data of one or more fingers of a user of the electronic device.

12. The electronic device according to claim 9, wherein each of the plurality of groups of account information comprises an account name and a password.

* * * * *